United States Patent
Inoue et al.

(10) Patent No.: US 7,286,253 B2
(45) Date of Patent: Oct. 23, 2007

(54) DATA PROCESSING APPARATUS CAPABLE OF VIEWING AND PRINTING A PLURALITY OF SCREENS

(75) Inventors: Yutaka Inoue, Tokyo (JP); Toshio Kenmochi, Kanagawa (JP); Shinya Kogure, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 10/114,041

(22) Filed: Apr. 3, 2002

(65) Prior Publication Data

US 2002/0145753 A1    Oct. 10, 2002

(30) Foreign Application Priority Data

Apr. 9, 2001   (JP)   ............................... 2001-110113

(51) Int. Cl.
G06K 15/00   (2006.01)
G09G 5/00    (2006.01)

(52) U.S. Cl. ..................... 358/1.15; 358/3.07; 358/3.2; 345/619; 345/1.1

(58) Field of Classification Search ................ 715/525, 715/527, 864; 358/1.15, 3.07, 3.08, 3.09, 358/3.2, 3.22, 507; 345/428, 419, 619, 532, 345/1.1, 2.2

See application file for complete search history.

(56) References Cited

U.S. PATENT DOCUMENTS

| | | | | |
|---|---|---|---|---|
| 4,580,242 A | * | 4/1986 | Suzuki et al. .............. | 358/1.13 |
| 5,425,138 A | * | 6/1995 | Kumakawa .................. | 715/510 |
| 5,680,629 A | * | 10/1997 | Slayden et al. ............. | 715/527 |
| 5,694,528 A | * | 12/1997 | Hube ......................... | 358/1.14 |
| 5,778,403 A | * | 7/1998 | Bangs ........................ | 715/527 |
| 5,956,487 A | * | 9/1999 | Venkatraman et al. ...... | 709/218 |
| 6,028,914 A | * | 2/2000 | Lin et al. ..................... | 379/14 |
| 6,208,427 B1 | * | 3/2001 | Lee ........................... | 358/1.15 |
| 6,297,836 B1 | * | 10/2001 | Kurashina .................. | 345/684 |
| 6,356,287 B1 | * | 3/2002 | Ruberry et al. ............. | 715/864 |
| 6,549,890 B2 | * | 4/2003 | Mundell et al. ............. | 705/10 |
| 6,667,814 B1 | * | 12/2003 | Tillotson .................... | 358/1.15 |
| 6,941,382 B1 | * | 9/2005 | Tuli ........................... | 709/247 |
| 2002/0046078 A1 | * | 4/2002 | Mundell et al. ............. | 705/10 |
| 2003/0009528 A1 | * | 1/2003 | Sharif et al. ................ | 709/206 |

OTHER PUBLICATIONS

"Using Internet Explorer 5.5" (http://www.healthnet.org.np/training/www/Internet_explorer2/default.html). pp. 4 and 5 of 7.*
"The History of Internet Explorer" (http://en.wikipedia.org/wiki/History_of_Internet_Explorer). p. 5 of 7.*

* cited by examiner

*Primary Examiner*—Jerome Grant, II
(74) *Attorney, Agent, or Firm*—Fitzpatrick, Cella, Harper & Scinto (57) ABSTRACT

A communication apparatus is provided which makes it possible to print out all data larger than a display screen in one operation. In addition, the communication apparatus reduces time required for print processing and eases a user's stress due to print waiting by diverting the data for display as the data for recording. In addition, the communication apparatus analyzes received data, generates data for display indicating a screen to be displayed on a display unit and generates data for printing from data for display corresponding to a plurality of screens according to an instruction of printing.

13 Claims, 13 Drawing Sheets

BEFORE PRESSING FUNCTIONAL KEY

TODAY'S WEATHER
TOKYO : FINE
KANAGAWA : FINE
CHIBA : FINE, OCCASIONALLY CLOUDY
SAITAMA : CLOUDY
GUNMA : CLOUDY

AFTER PRESSING FUNCTIONAL KEY

TODAY'S WEATHER
TOKYO : FINE
KANAGAWA : FINE
CHIBA : FINE, OCCASIONALLY CLOUDY
SAITAMA : CLOUDY

| SAVE | DELETE | PRINT |

DATA PROCESSING APPARATUS CAPABLE OF VIEWING AND PRINTING A PLURALITY OF SCREENS

BACKGROUND OF THE INVENTION

1. Field of the Invention

The present invention relates to a communication apparatus or a peripheral apparatus that is capable of receiving data from a web server and, analyzing, converting, displaying and recording the received data.

2. Related Background Art

In recent years, as the Internet has been increasingly widespread, a user of the Internet can easily browse web data, which is usually accessed from a PC and browsed conventionally, from various portable terminals such as those represented by a cellular phone.

In addition, it is also possible to print information that such a terminal receives by connecting a printer to the portable terminal. Further, it is also possible to receive and display web data and print the displayed data by a terminal incorporating a portable terminal and a printer, a so-called portable terminal with a printer function.

SUMMARY OF THE INVENTION

However, conventionally, when received HTML data is printed, only data displayed on a screen is directly printed. Thus, in order to print out data of a size larger than a display screen, a user has to switch the display screen every time the user prints a part of the data and repeats a printing operation. This makes the operation complicated and causes unnecessary labor for the user.

Therefore, in the present invention, data for display that is stored dispersedly over a predetermined number of screens is collectively stored as data for recording and the data for recording is printed, whereby all data larger than a display screen can be printed out in one operation. In addition, time required for print processing is reduced and a user's stress due to print waiting is eased by diverting the data for display as the data for recording.

DETAILED DESCRIPTION OF THE PREFERRED EMBODIMENTS

FIRST EMBODIMENT

A communication apparatus with a web browser function of an embodiment in accordance with the present invention, in particular a facsimile apparatus will be hereinafter described with reference to the drawings. Further, the present invention is not limited to a facsimile apparatus and is also applicable to other OA apparatuses such as a copying machine, a compound machine, a laser beam printer and an ink-jet printer.

Figure 1:
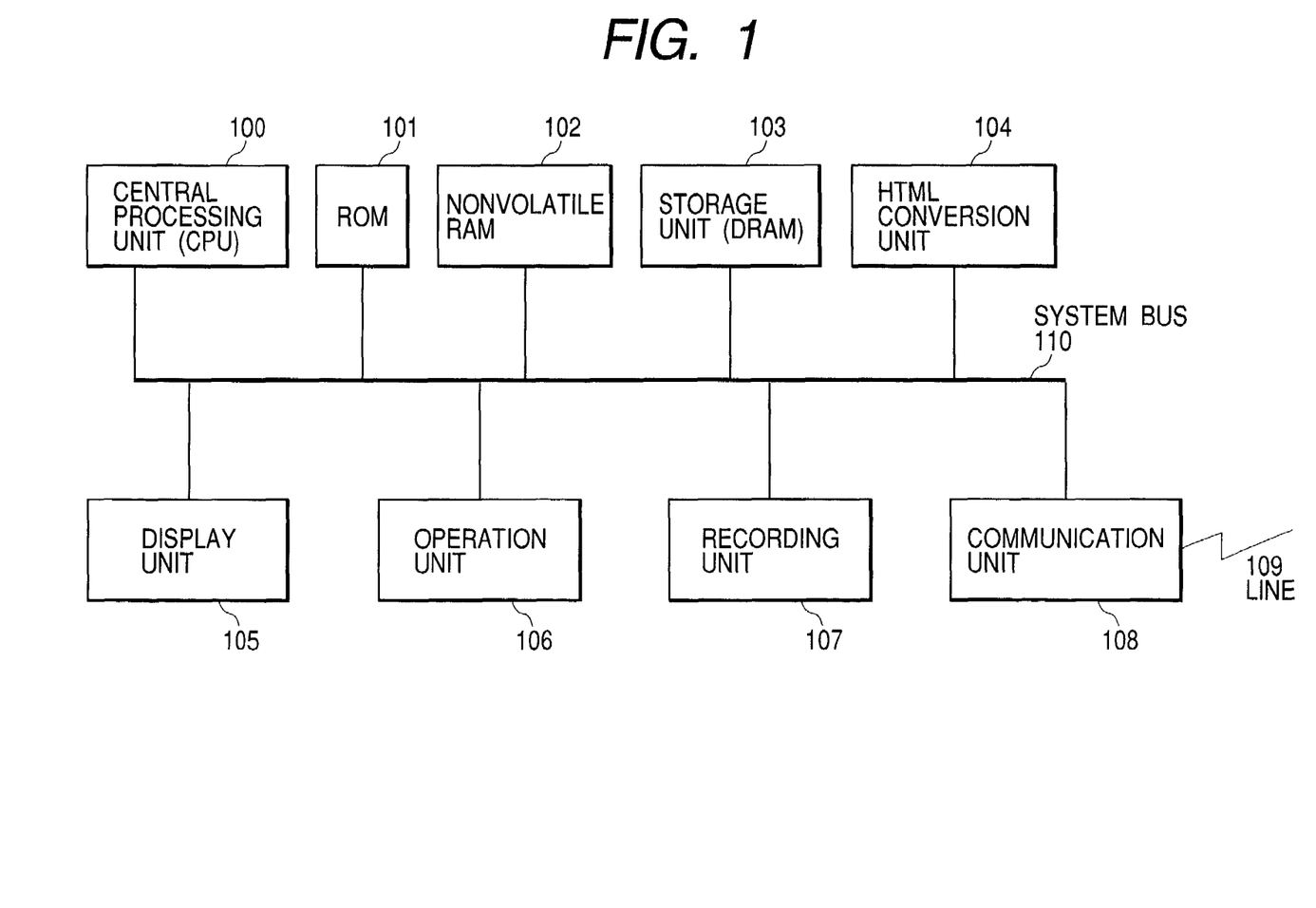
FIG. 1 is a diagram showing an example of a configuration of a communication apparatus with a web browser function.

FIG. 1 is a diagram showing an example of a configuration of a communication apparatus with a web browser function of this embodiment. In FIG. 1, reference numeral 100 denotes a central processing unit (CPU) for controlling the entire apparatus. Reference numeral 101 denotes a ROM for storing a program and data. Reference numeral 102 denotes a nonvolatile RAM for storing individual data and data for backup such a telephone directory. Reference numeral 103 denotes a storage unit (DRAM) for storing CPU work data (data that is used when the CPU is executing processing), HTML data, data for display, data for recording and the like.

In addition, reference numeral 104 denotes an HTML conversion unit for analyzing HTML data received via the Internet to divide the data into image data and text data and converting the divided data into data for display or data for recording. The HTML conversion unit 104 analyzes HTML data and obtains image data linked from the HTML data, if necessary, to generate data for display and data for recording.

Reference numeral 105 denotes a display unit for displaying contents of received data and a state of the apparatus. Reference numeral 106 denotes an operation unit constituted by a ten key and the like. Reference numeral 107 denotes a recording unit such as a printer for printing an image or a text based on received image data and text data. Reference numeral 108 denotes a communication unit constituted by a modem for communicating with the outside via a telephone line 109. Here, each processing unit is mutually connected via a system bus 110.

Figure 2:
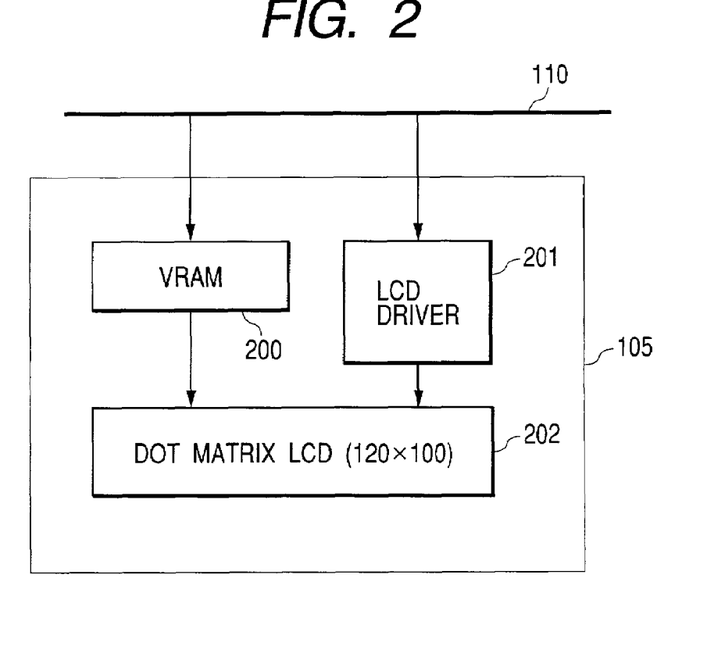
FIG. 2 is a diagram of a display unit.

FIG. 2 is a diagram of the display unit 105. The display unit 105 is constituted by a VRAM 200 for storing data for display and an LCD driver 201 for causing a dot matrix LCD 202 to output contents of the VRAM 200. The LCD driver 201 controls the dot matrix LCD 202 based on the data for display stored in the VRAM 200, whereby various kinds of information are displayed.

Figure 3:
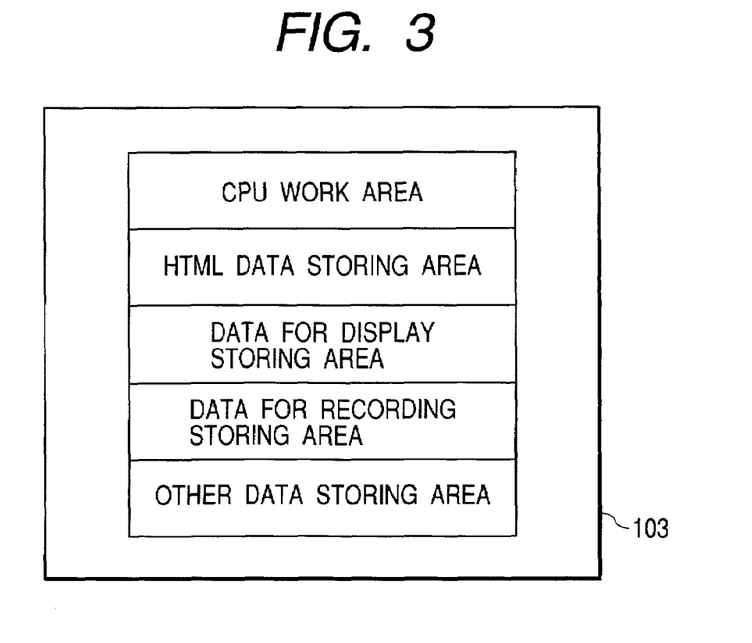
FIG. 3 is a diagram of a storage unit.

FIG. 3 is a diagram of the storage unit 103. The storage unit 103 (DRAM) is constituted by a CPU work area used as work of the CPU 100, an HTML data storing area for storing received HTML data, a data for display storing area for storing data for display, a data for recording storing area for storing data for recording and an other data storing area for storing other data.

Receiving and displaying operation of HTML data will be described using the above-described FIGS. 1 to 3. Here, it is assumed that a line is already in a connected state by a line connecting operation that is not described. In this state, the communication apparatus receives HTML data through the telephone line 109 and the communication unit 108 and stores the received HTML data in an HTML data storing area of the storage unit 103. Here, a line may be disconnected every time receipt of HTML data ends, whereby an amount of communication and a communication charge corresponding to the amount of communication can be reduced.

Next, the HTML data stored in the HTML data storing area of the storage unit 103 is passed to the HTML conversion unit 104, converted to data for display and stored in a data for display area of the storage unit 103. Moreover, data that should be displayed now among the data stored in this data for display area is sent to the VRAM 200 of the display unit 105 and displayed on the dot matrix LCD 202 under the control of the LCD driver 201.

Display processing and print processing of HTML data in accordance with the present invention will be hereinafter described.

Figure 4:
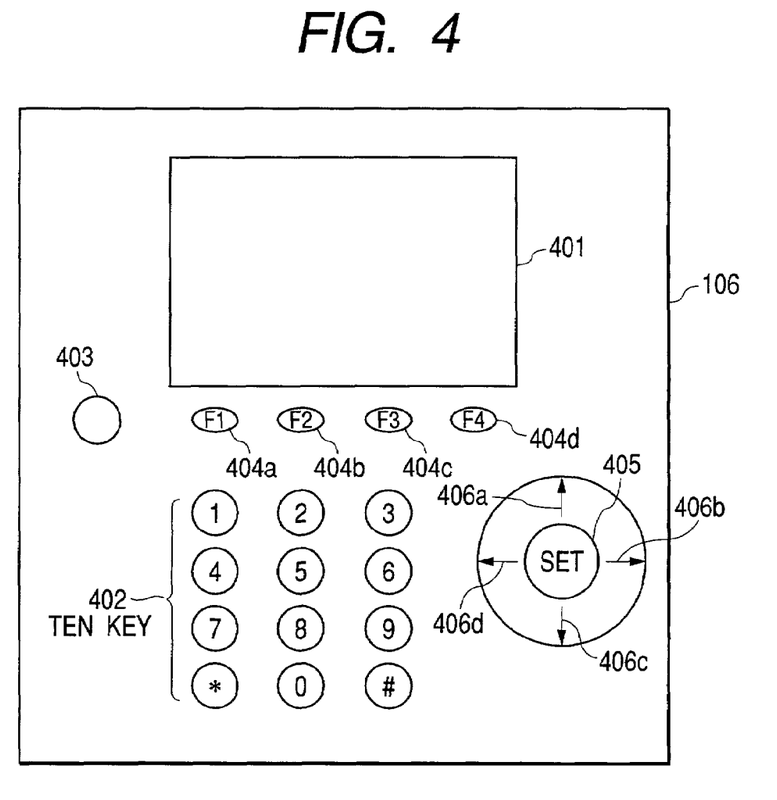
FIG. 4 is a diagram of an operation unit.

FIG. 4 is a diagram of the operation unit 106 of this apparatus. The operation unit 106 is constituted by a display portion 401 such as an LCD, a ten key 402 used for inputting a telephone number, a functional key 403 with which a user can start function setting and the like, function keys 404a, 404b, 404c and 404d used for multiple inputs, a set key 405 functioning as a setting input key and, left, right, up and down arrow keys 406a, 406b, 406c and 406d used for moving a cursor on the display portion, and the like. Further, in practice, the display portion 401 corresponds to the dot matrix LCD 202 of FIG. 2.

Figure 5:
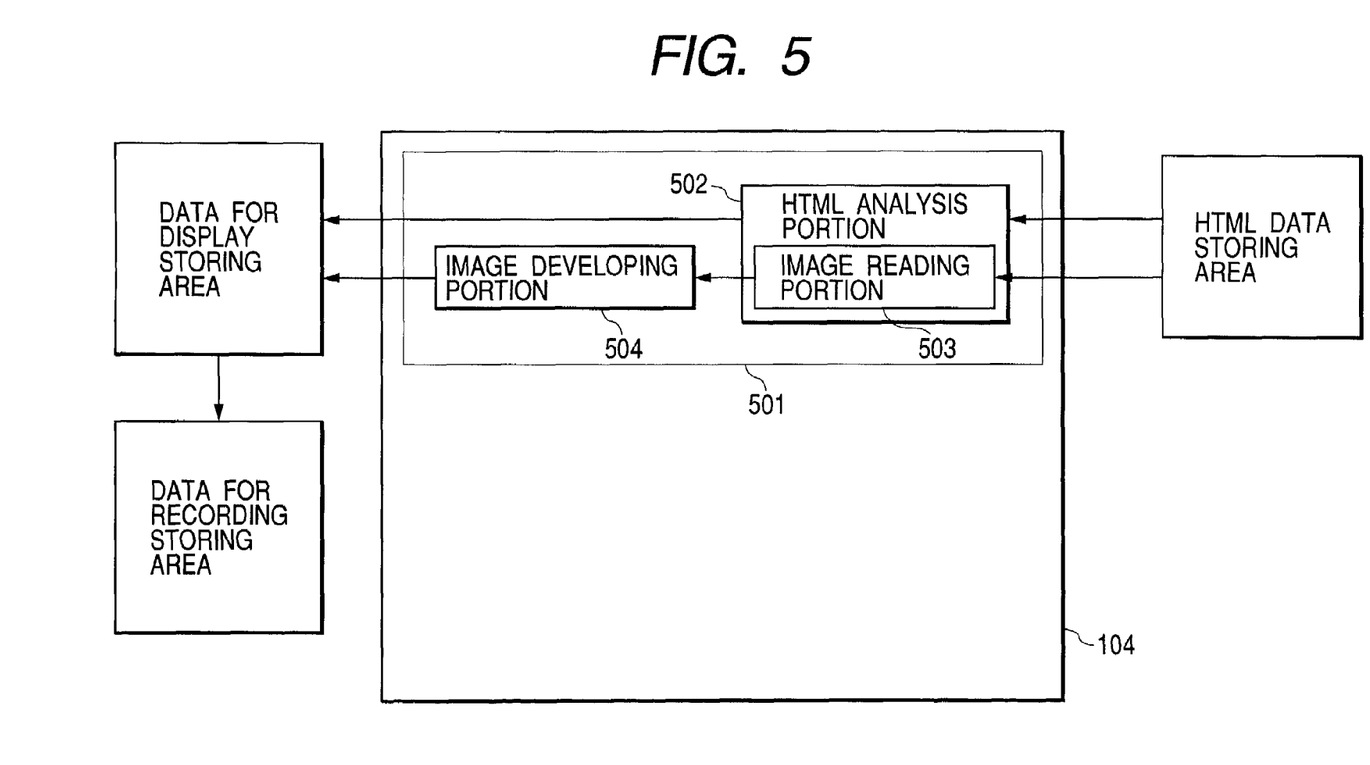
FIG. 5 is a diagram of an HTML conversion unit.

FIG. 5 is a diagram of the HTML conversion unit 104. The HTML conversion unit 104 is constituted by an HTML converting portion for display 501 for converging HTML data to data for display.

An HTML analysis portion 502 reads out HTML data from the HTML data storing area of the storage unit 103 in which the HTML data is stored, analyzes the HTML data and converts the HTML data to data for display. Then, if it is found that a link referring to other image data and image file exists in the HTML data as a result of analyzing by the HTML analysis portion 502, an image reading portion 503 reads out the image data from the HTML data storing area. Further, although it is assumed here that image data and an image file as described above are received together with the HTML data, the image reading portion 503 may obtain image data and an image file from the outside via the communication unit 108 every time it receives HTML data.

An image developing portion 504 develops the image data read by the image reading portion 503 into data for display and stores the generated data for display in the data for display storing area. Here, the data for display generated from the HTML data in the HTML analysis portion 502 and the image data for display developed from the image data in the image developing portion 504 are stored in the data for display storing area of the storage unit 107, thereby being composited.

Moreover, the data stored in the data for display storing area is transferred to the VRAM 200 of the display unit 105 and displayed on the dot matrix LCD 202. Further, the data in the data for display storing area is stored in the data for recording storing area of the storage unit 107, thereby being diverted to printing as well. That is, the data for display generated for display is also diverted to print processing, whereby the print processing is performed quickly.

Figure 6:
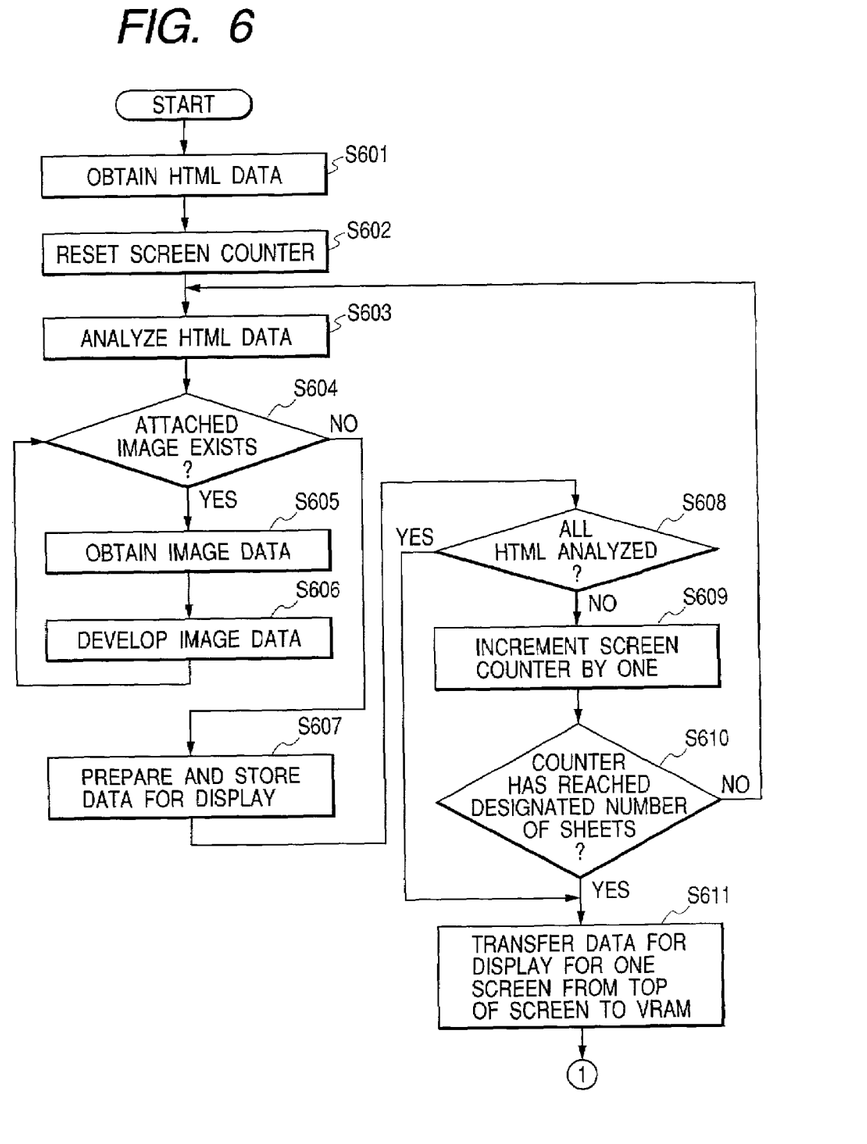
FIG. 6 is a flow chart showing a display processing operation of HTML data.
Figure 7:
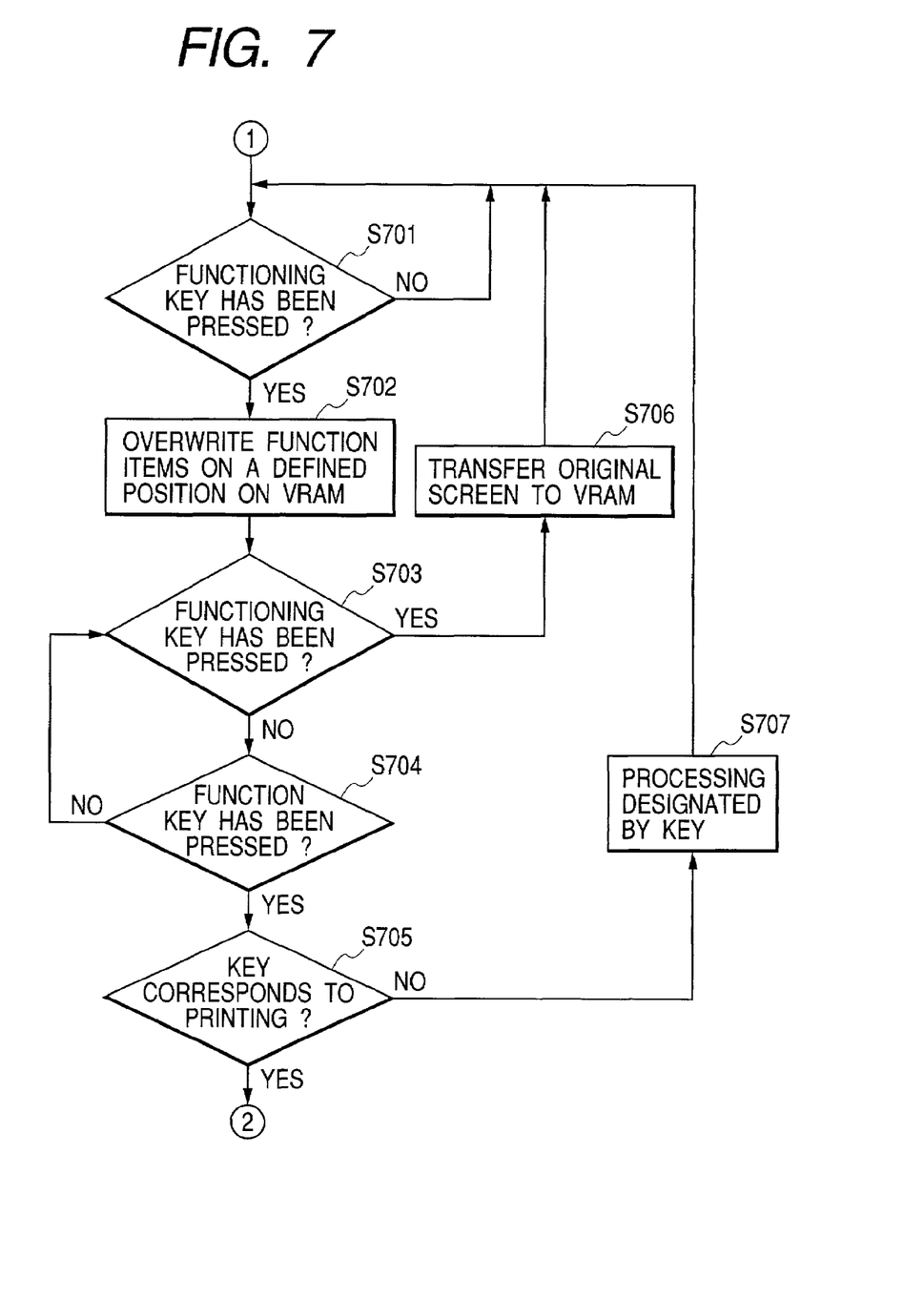
FIG. 7 is a flow chart showing a key processing operation.
Figure 8:
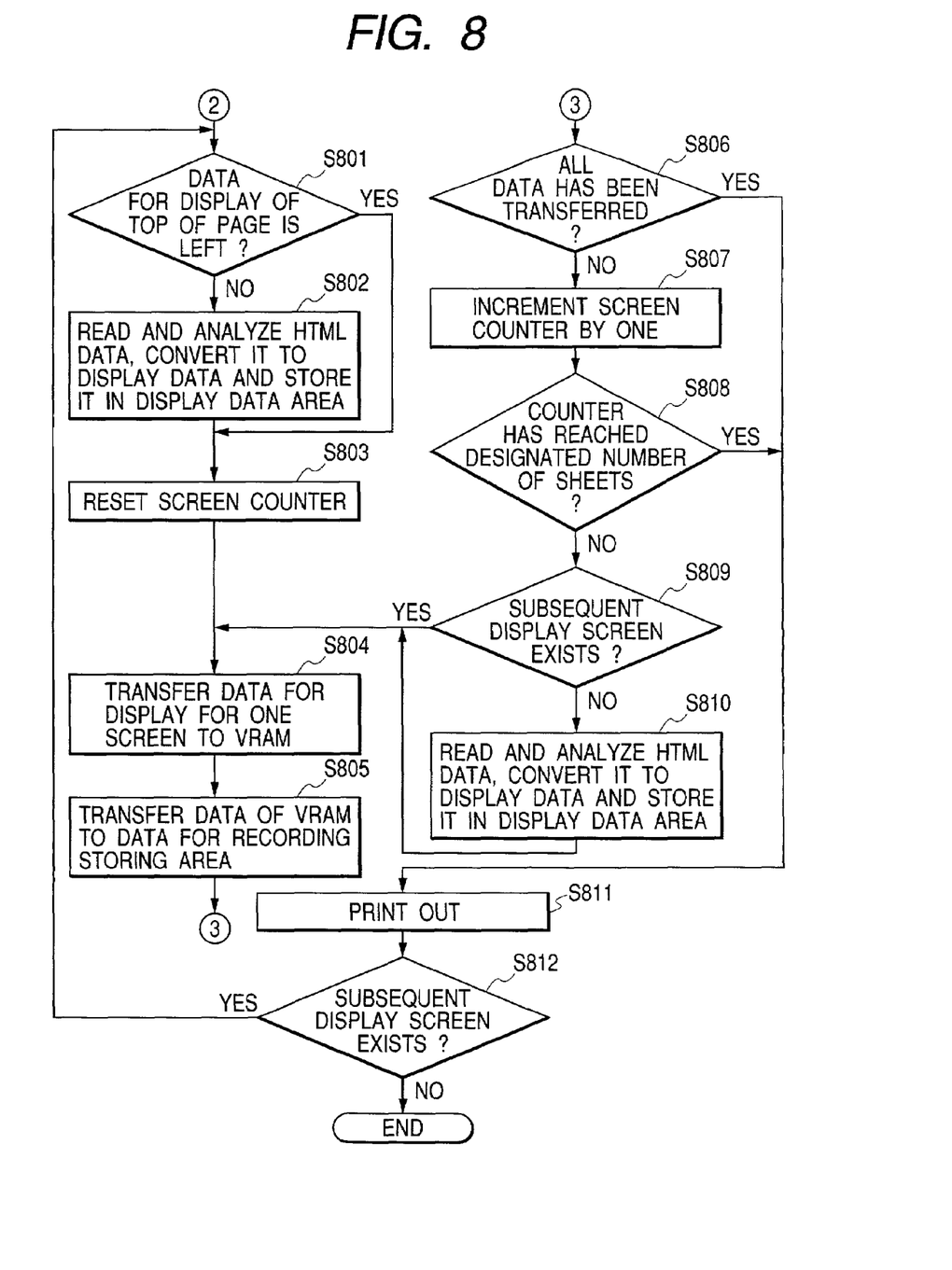
FIG. 8 is a flow chart showing a print processing operation.

Next, a display operation and a printing operation of the above-described HTML data will be described in detail based on flow charts of FIGS. 6 to 8. Further, an operation based on this flow chart is executed by each unit and portion of FIGS. 1 and 5 that performs processing based on a control program.

First, a display processing operation will be described with reference to FIG. 6. The communication unit makes a connection with an HTML server through a line by a well-known method, obtains (receives) HTML data from the server and stores the HTML data in the HTML data storing area of the storage unit 103 (S601).

Next, a screen counter for a display screen (data for display corresponding to the number of screens shown by the screen counter is accumulated in the data for display area in advance) is cleared (S602). Next, the HTML analysis portion 502 analyzes the stored HTML data (S603). In doing so, the HTML analysis portion 502 determines whether or not image data of a format such as GIF and JPEG other than HTML text data is required (S604). If image data is included, the image reading portion 503 reads out pertinent image data from the HTML data storing area (S605) and the image developing portion 504 develops the read out image data to a format of bit map data for display (S606)

After processing all the image data, the HTML analysis portion 502 analyzes a text data part to develop it to a format for display and finally stores data for display generated from the image data and data for display generated from the text data in the data for display storing area (S607).

In this way, after preparing data for display corresponding to one screen of a display screen, the communication apparatus determines whether or not the analysis of all the HTML data has ended on the screen (S608). When it is determined that the analysis has ended, the communication apparatus transfers the data stored in the data for display storing area to the VRAM 200 of the display unit 105 and causes the display portion 401 to display the screen (S611).

Moreover, if it is determined in step S608 that all the HTML data has not been processed, the communication apparatus increments the screen counter for a display screen by one (S609) and determines whether or not the screen counter has reached a designated value (S610). If the screen counter has reached the designated value, the communication apparatus proceeds to step S611 and, if not, proceeds to step S603. For example, if the number of screens defined in advance is three, data for display corresponding to a first screen is transferred to the VRAM 200 of the display unit 105 and displayed at the stage where data for display corresponding to a display screen for three screens is developed and stored in the data for display storing area.

In this way, in this example, since only data for display for a predetermined number of screens is prepared, for example, even if certain HTML data is displayed over a plurality of screens, data for display can be prepared as required and display processing can be performed quickly.

In addition, since data for display for a predetermined number of screens is prepared, it is unnecessary to perform generation processing of data for display every time a screen is shifted and shifting of a screen can be performed smoothly.

Figure 9:
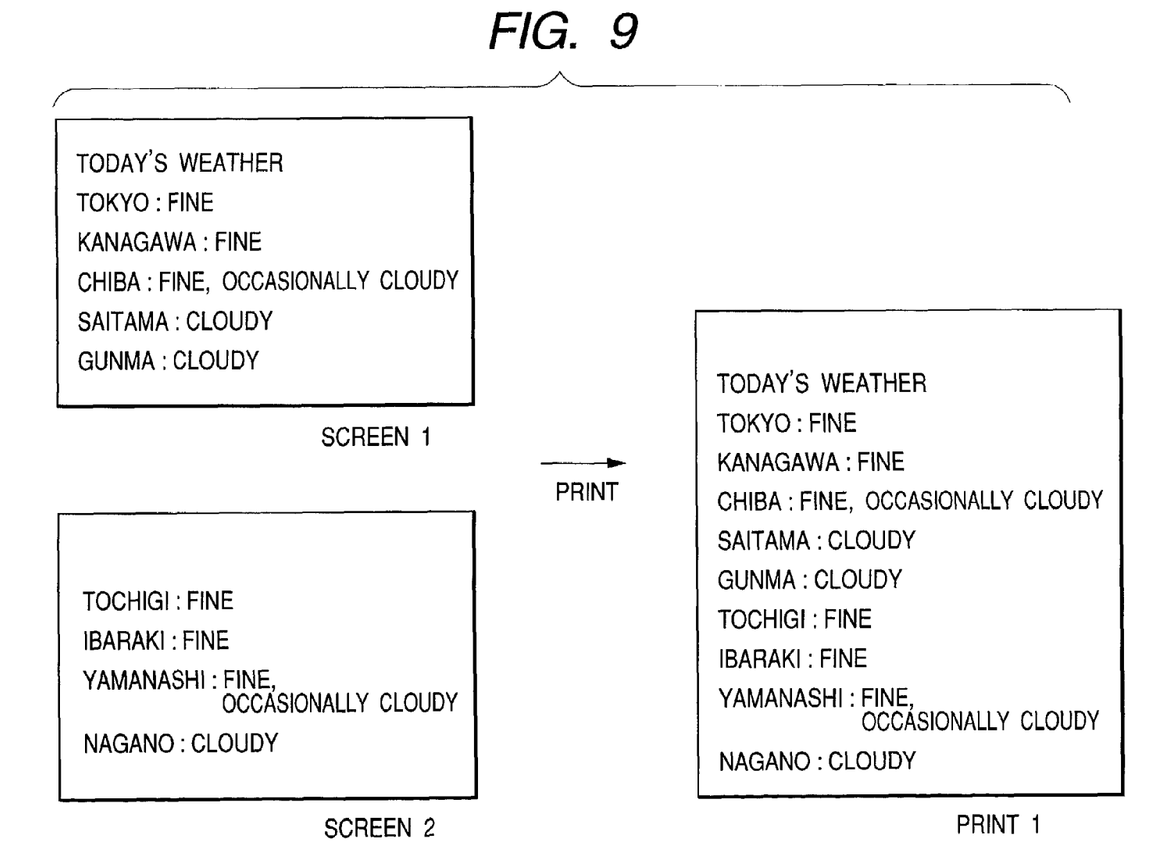
FIG. 9 illustrates an example of a display screen and an example of printing.

For example, data for display corresponding to a screen 1 and data for display corresponding to a screen 2 of FIG. 9 are prepared and stored in the data for display area, whereby, if downward scroll is selected by the arrow key 406 of the operation unit 106 when the screen 1 is displayed, development processing of data for display corresponding to the next screen (screen 2) is skipped and the next screen (screen 2) can be instantly displayed.

Figure 10:
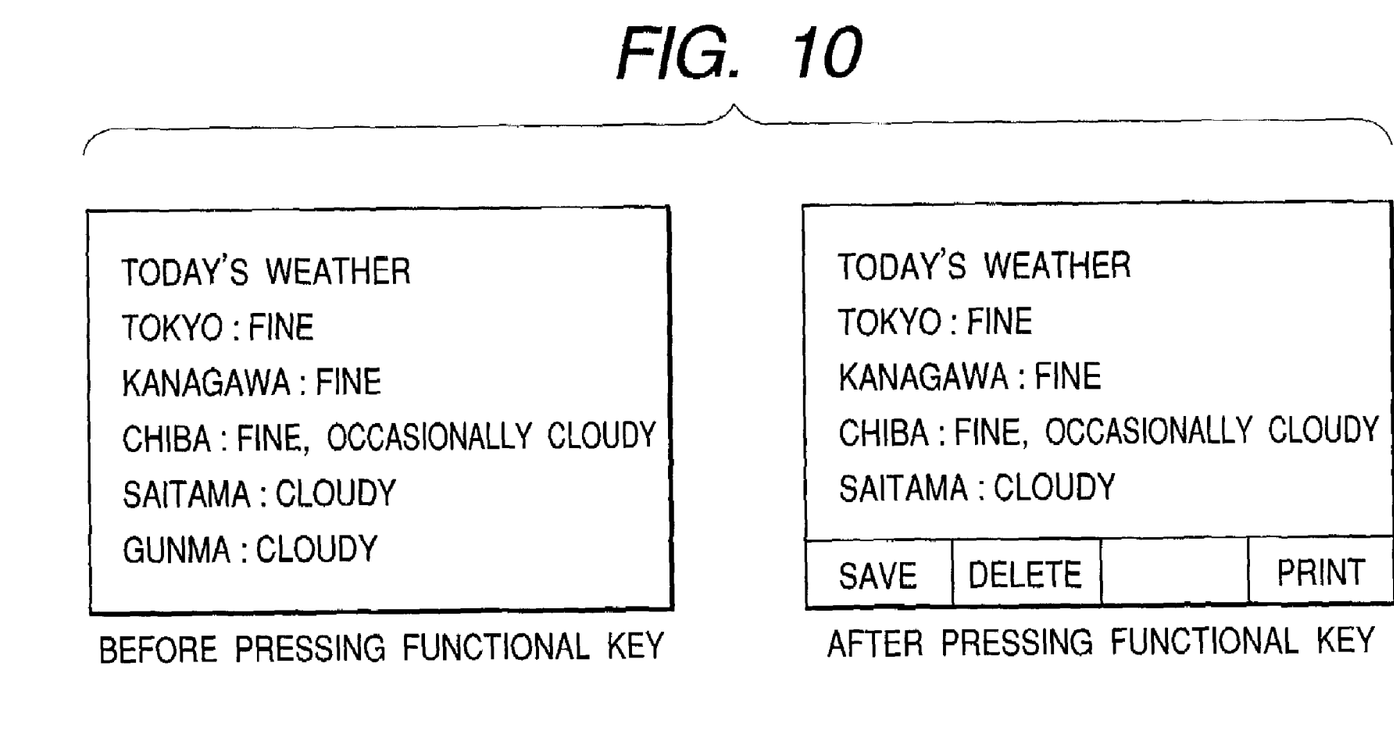
FIG. 10 illustrates a display screen on which functional keys are displayed.

Subsequently, a key processing operation will be described with reference to FIG. 7. The communication apparatus determines whether or not the functional key 403 of the operation unit 106 has been pressed in a state of step S611 of FIG. 6 (e.g., a state in which a screen shown on the left side of FIG. 10 is displayed) (S701). If it is determined that the functional key has been pressed, the communication apparatus overwrites to display function buttons corresponding to the function keys 404a to 404d on a part of the displayed data for display as shown on a screen on the right side of FIG. 10 (S702). More specifically, the communication apparatus overwrites display data corresponding to a function part shown on the right side of FIG. 10 on the VRAM 200 of the display unit 105 such that the data is displayed on the lowest part of the data for display.

Moreover, the communication apparatus determines whether or not the functional key has been pressed (S703). If the functional key has been pressed again, the communication apparatus overwrites the data of the function display part with the original data or otherwise stops the function display to return it to the original data display (S706).

With such a configuration, a function button for performing startup of a function is displayed only when a function operation being an additional operation is necessary. Thus, if the function is unnecessary, since information of HTML data is not hidden and reduced, it becomes possible to efficiently notify a user of a lot of information.

In addition, on the screen on the right side of FIG. 5, a function for saving data in a nonvolatile backup area (nonvolatile RAM 102 of FIG. 1) is assigned to the function key 404a, a function for performing deletion of data from the backup area is assigned to the function key 404b, and a function for performing printing of a display screen is assigned to the function key 404d.

Thus, the communication apparatus determines which one of the function keys 404a to 404d has been pressed (S704) and, in particular, determines whether or not the function key for printing (function key 404d in the above-described example) has been pressed (S705). If the function key for saving or deletion is selected, the communication apparatus executes the above-described function of saving or deletion (S707). If the function key for printing has been selected, the communication apparatus performs the print processing shown in FIG. 8.

Next, a print processing operation will be described with reference to FIG. 8. When printing is instructed, entire HTML data corresponding to a display screen currently displayed (if a part of the display screen based on a part of the HTML data is displayed, all of the part of the HTML data) is printed. Further, since the HTML data is large, if the data cannot be printed on one sheet, it is printed over a few pages.

Therefore, the communication apparatus determines whether or not data for display corresponding to a top of a page is left in the data for display storing area (S801). If the data for display is not left, the HTML conversion unit 104 reads out HTML data of the screen from the HTML data storing area, converts it to data for display and stores it in the data for display storing area (S802).

Next, the communication apparatus clears the screen counter for printing (S803) and switches the display screen such that a screen corresponding to the top of the page is displayed (S804) If it is determined in step S801 that the data for display of the top of the page is left in the data for display storing area, the communication apparatus directly clears the screen counter for printing (S803) and transfers the data for display corresponding to the top of the page to the VRAM 200 of the display unit 105 (S804).

Moreover, the communication apparatus also transfers the data for display to the data for recording storing area (S805). Here, the communication apparatus determines whether or not all the data for display to be recorded has been transferred to the data for recording storing area (S806). If it is determined that the data for display has been transferred, the communication apparatus proceeds to step S811, where all the data stored in the data for recording storing area is printed out (S811). All the data for display to be recorded is transferred to the data for recording storing area in the case where printing based on HTML data is less than one sheet or in some other cases.

Here, if the data for display to be recorded is still left, the communication apparatus increments a screen counter for printing by one (S807) and determines whether or not this screen counter has reached a designated value (S808). If the screen counter has not reached the designated value, the communication apparatus determines whether or not subsequent data for display exists in the data for display storing area (S809). If the subsequent data for display exists in the data for display storing area, the communication apparatus immediately proceeds to step S804. Here, if the subsequent data for display does not exist in the data for display storing area, the communication apparatus generates the data for display from HTML data and stores it in the data for display storing area (S810).

In step S808, if the screen count has reached the designated value, the communication apparatus proceeds to step S811. It is sufficient if this designated value is set at the number of display screens that can be printed on one sheet. Consequently, even if a printing area is generally larger than a screen area, since data for a plurality of screens is accumulated and printed, the number of sheets to be printed is not unreasonably increased and paper resources are not wasted.

After printing is executed in step S811, the communication apparatus determines whether or not the data for display to be printed on the next page is left (S812). For example, if HTML data is so large that printing extends over a plurality of sheets, the communication apparatus shifts to printing of the next page. Therefore, if the data for display to be printed is left, the communication apparatus proceeds to step S801 and continues print processing of the next page.

In this way, in this embodiment, even if a part of a home page described by certain HTML data is displayed, the entire home page is printed on one or a plurality of sheets by only one print instruction. Thus, a user can easily perform printing based on the HTML data and operability of the printing is improved.

FIG. 9 illustrates an example of a display screen and an example of printing. If a function key of printing is pressed in a state in which a screen 1 (or screen 2) is displayed, printing as indicated in a print 1 is performed by the above-described print processing operation. In addition, even if a home page of "today's weather" extends over a plurality of sheets, printing is performed in order from the first page.

SECOND EMBODIMENT

Figure 11:
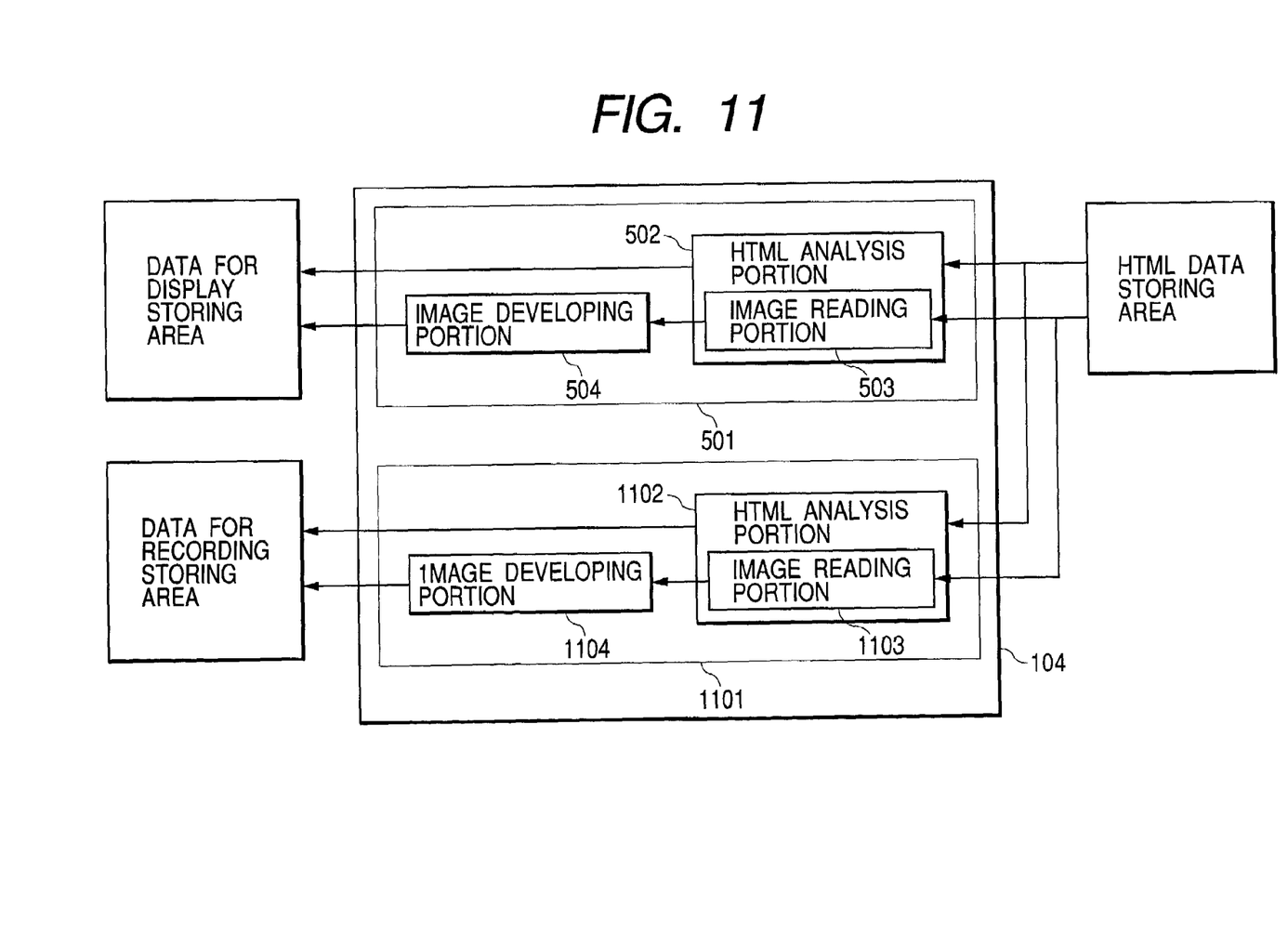
FIG. 11 is a diagram of the HTML conversion unit.

Next, second printing means of the present invention will be described. FIG. 11 shows a configuration of an HTML conversion unit used in this embodiment. In the figure, an HTML data storing area, a data for display storing area and a data for recording storing area are areas assigned to the above-described storage unit 103.

The HTML data storing area is used for storing HTML data obtained from the Internet and image data such as that of GIF and JPEG referred to from the HTML data. The data for display storing area is used for storing data to be displayed on an LCD, which is developed HTML data. The data for recording storing area is used for storing data to be used for printing, which is developed HTML data.

The HTML conversion unit 104 consists of the HTML converting portion for display 501 and an HTML converting portion for recording 1101. As described with reference to FIG. 5, the HTML converting portion for display 501 is constituted by the HTML analysis portion 502 for analyzing HTML data in the HTML data storing area and converting it to data for display, the image reading portion 503 for reading image data from the HTML data storing area when the image data is referred to from the HTML data and the image developing portion 504 for developing the read image data. The data for display prepared by the HTML converting portion for display 501 is stored in the data for display storing area.

On the other hand, the HTML converting portion for recording 1101 is constituted by an HTML analysis portion 1102 for analyzing HTML data in the HTML data storing area and converting it to data for recording, an image reading portion 1103 for reading image data from the HTML data storing area when the image data is referred to from HTML data and an image developing portion 1104 for developing the read image data. The data for recording prepared by the HTML converting portion for recording 1101 is stored in the data for recording storing area.

In this way, two HTML converting portions are provided, whereby data converted by different fonts or different resolutions can be prepared, respectively, from original HTML data and image data. Consequently, data conversion conforming to a display size can be applied to data for display and data conversion conforming to a print size can be applied to print data.

Next, a display operation and a printing operation of HTML data will be described based on flow charts of FIGS. 12 to 15. A communication apparatus has made a connection to the Internet according to an instruction of a user, obtained HTML data required for displaying a WEB screen and image data of GIF, JPEG and the like from a WEB server and stored the data in the HTML storing area of the storage unit 103. After obtaining the HTML data, the communication apparatus may continue to connect a line or may disconnect the line.

Figure 12:
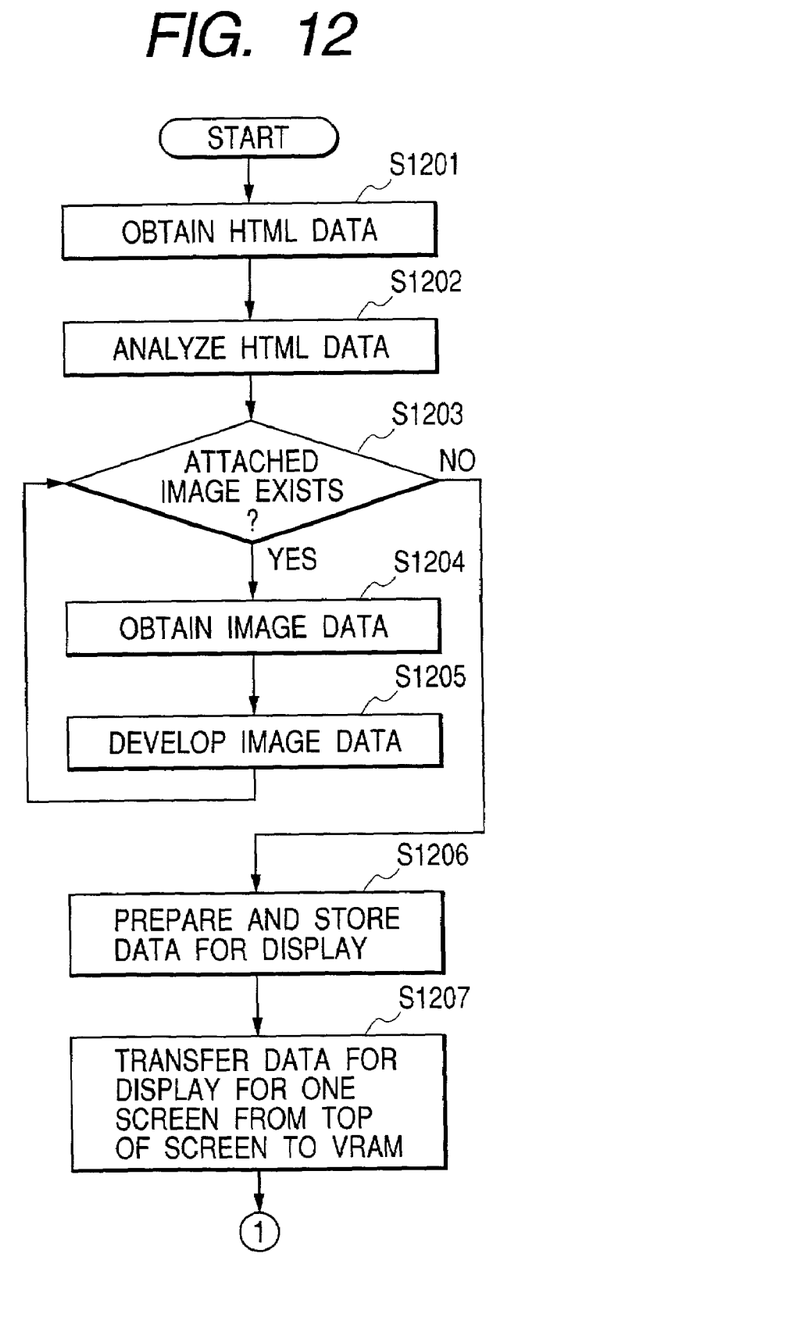
FIG. 12 is a flow chart showing a display processing operation of HTML data.

Next, when HTML data that the user wishes to display on a screen is designated, the communication apparatus obtains HTML data stored in the HTML storing area (S1201) and analyzes the HTML data in the HTML converting portion for display 501 of the HTML analysis unit 104 (S1202). Then, the communication apparatus prepares data for display from a result of the analysis and stores it in the data for display storing area (S1206).

If an image is attached to the HTML data (YES in S1203), the image reading portion 503 obtains image data stored in the HTML storing area (S1204) and the image developing portion 706 develops the image data (S1205) and, then, prepares data for display and stores it in the data for display storing area (S1206).

When the data for display for screen display is collected in the data for display storing area, the communication apparatus transfers the data for display to the VRAM 200 of the display unit 105 and displays the data on the screen (S1207).

Figure 13:
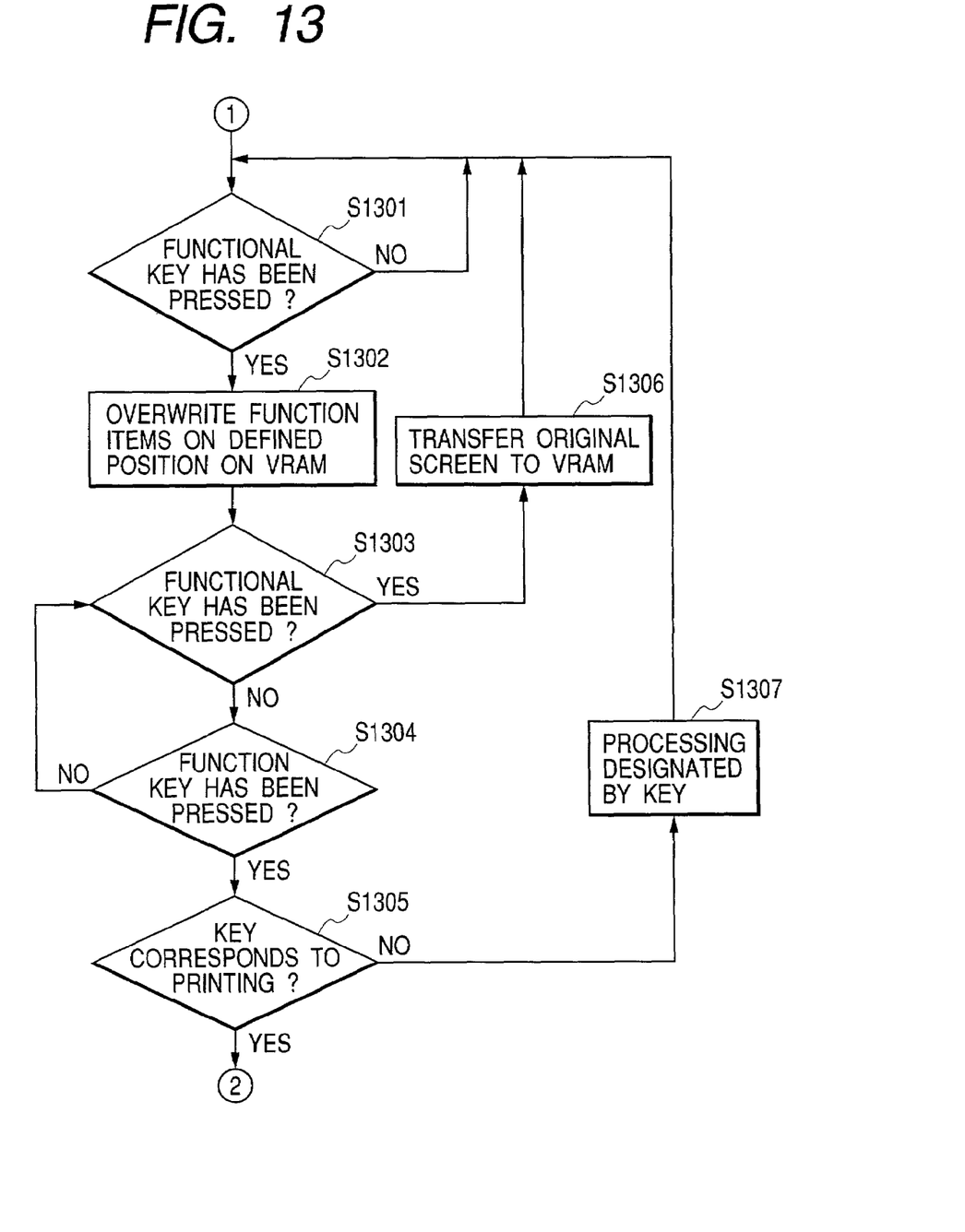
FIG. 13 is a flow chart showing a key processing operation.

When a WEB screen is displayed using an entire LCD as shown in a screen on the left side of FIG. 10, if the functional key 403 is pressed (YES in S1301), the communication apparatus displays function items on the LCD as shown in a screen on the right side of FIG. 10 (S1302).

The function items correspond to function keys (F1, F2, F3 and F4) in the lower part of the display unit. When the F1 key is pressed here, an operation written in a frame in the lower left of the LCD (saving operation in the screen on the left side of FIG. 10) is performed. The functions keys have an effect that a key can be assigned according to a change in a state of the communication apparatus as required at the time and the number of keys can be reduced.

In addition, an item corresponding to a key is not always displayed but is displayed only when the functional key is pressed, whereby the display unit can be effectively used spaciously when a key operation is not required.

When the function items are displayed on the LCD as in the screen on the right side of FIG. 10, if the functional key 403 is pressed (YES in S1303), the communication apparatus returns the screen to the one for performing display using the entire LCD as in the screen on the left side of FIG. 10 (S1306).

When the function items are displayed on the LCD, if any one of the function keys (F1, F2, F3 and F4) is pressed (YES in S1304), the communication apparatus performs processing designated by the function key (S1307). If the pressed function key is a key corresponding to printing (YES in S1305), the communication apparatus enters a printing mode.

Figure 14:
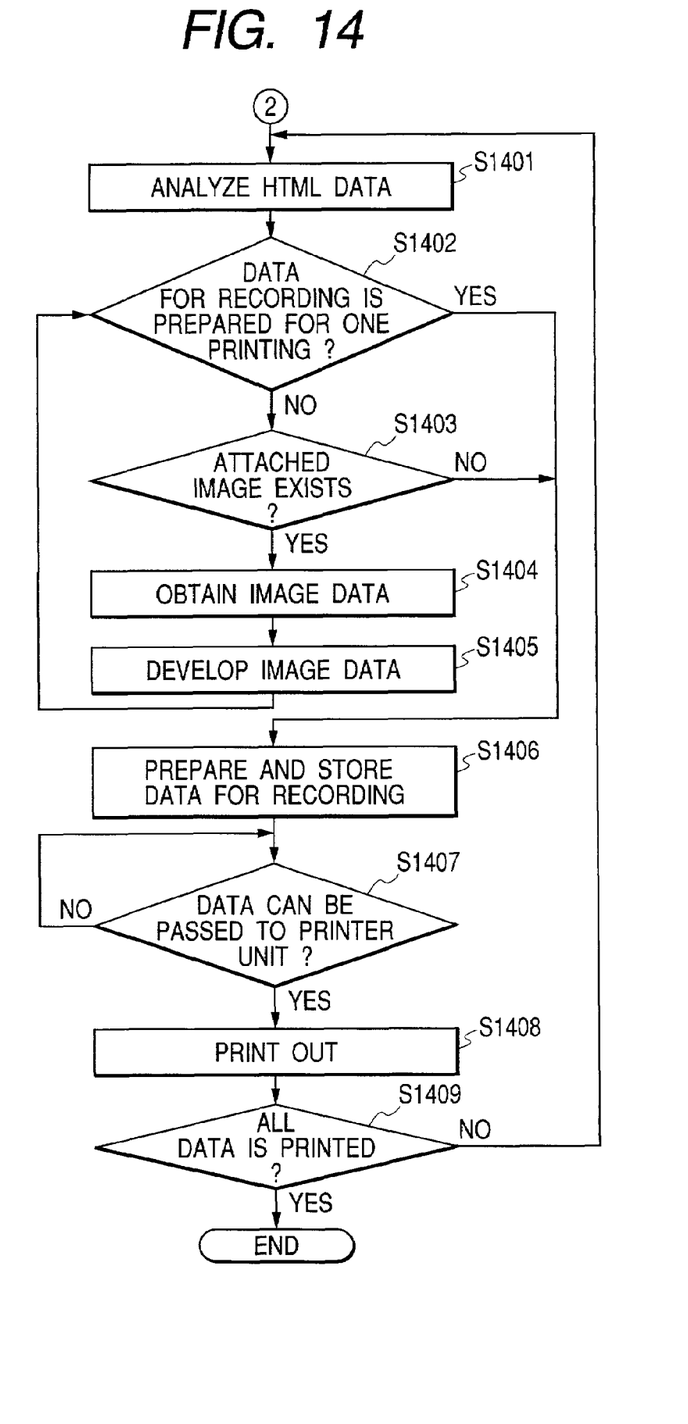
FIG. 14 is a flow chart showing a print processing operation.

When entering the printing mode, the communication apparatus analyzes the HTML data stored in the HTML storing area in the HTML converting portion for recording 1101 of the HTML analysis unit 104 (S1401), prepares data for recording and stores it in the data for recording storing area (S1406). As a result of analyzing the HTML data, if image data is required (YES in S1403), the image reading portion 1103 obtains image data stored in the HTML storing area (S1404) and the image developing portion 1104 develops the image data (S1405) and, then, prepares data for recording.

When the data for recording is prepared for one printing (YES in S1402) or the analysis of the entire HTML data ends (NO in S1403), the communication apparatus stores the prepared data for recording in the data for recording storing area (S1406).

When the data for recording is stored, the communication apparatus checks whether or not a printer unit is ready to receive the data (S1407). If the printer unit is ready, the communication apparatus determines that the data can be passed to the printer unit, passes the data to the printer unit and causes it to perform printing (S1408).

Then, the communication apparatus determines whether or not all printings have ended (S1409) and, if not, returns to the step S1401.

In this way, in the second embodiment, since HTML data for display and HTML data for printing can be converted with different fonts and resolutions, optimal images can be outputted in the display operation and the printing operation, respectively.

As described above, according to the present invention, since only data for display for a predetermined number of screens is prepared, for example, even if certain HTML data is displayed over a plurality of screens, data for display can be prepared as required and display processing can be performed quickly. Moreover, since the data for display for a predetermined number of screens is prepared, it is unnecessary to perform generation processing of data for display every time a screen is shifted, whereby the screen is shifted smoothly.

In printing, data for display dispersedly stored for a predetermined number of screens is collectively stored as data for recording and the data for recording is printed, whereby data larger than a display screen can be printed out with one operation and a user's labor can be saved. Moreover, the data for display is diverted as the data for recording, time required for print processing can be reduced and a user's stress due to print waiting is eased.

Further, the number of display screens that can be printed on one sheet is set, whereby, even if a printing area is generally larger than a screen area, since data for a plurality of screens is accumulated and printed, the number of sheets to be printed is not unreasonably increased and paper resources are not wasted. Moreover, since the data for recording is partitioned for each page, unnecessary blank is not created on a print sheet and waste of sheets can be reduced.

What is claimed is:

1. A data processing apparatus comprising:
    a communication unit constructed to receive data from an external apparatus;
    a display data generating unit constructed to analyze the data received by said communication unit and to generate display data indicating a screen to be displayed;
    a display unit constructed to display the screen to be displayed based on the display data generated by said display data generating unit;
    a display data storage unit constructed to store the display data generated by said display data generating unit;
    a print data generating unit constructed to generate print data indicating an image to be printed corresponding to a plurality of screens from the display data generated by said display data generating unit; and
    a printing unit constructed to print the image corresponding to the plurality of screens based on the print data generated by said print data generating unit,
    wherein, if it is determined that the display data indicating one of the plurality of screens is stored in said display data storage unit, said print data generating unit generates the print data corresponding to the one of the plurality of screens from the display data which is stored in said display data storage unit, and
    if it is determined that the display data indicating another of the plurality of screens is not stored in said display data storage unit, said display data generating unit generates the display data indicating the another of the plurality of screens and said print data generating unit generates the print data corresponding to the another of the plurality of screens from the display data which is generated by said display data generating unit after it is determined that the display data indicating the another of the plurality of screens is not stored in said display data storage unit.

2. The data processing apparatus according to claim 1, wherein said display data generating unit generates display data corresponding to a set number of screens, and
    wherein said display unit displays one of the set number of screens after said display data generating unit generates the display data corresponding to the set number of screens.

3. The data processing apparatus according to claim 1, wherein said print data generating unit combines display data corresponding to a set number of screens into the print data.

4. The data processing apparatus according to claim 1, wherein said communication unit is capable of receiving web data via a telephone line.

5. The data processing apparatus according to claim 1, wherein said display unit displays items indicating predetermined functions, and
    wherein said data processing apparatus further comprises buttons corresponding to the items displayed by said display unit.

6. The data processing apparatus according to claim 1, wherein items displayed by said display unit include one indicating an instruction of printing, and
    wherein said print data generating unit generates the print data in response to pressing of a button corresponding to the item indicating the instruction of printing.

7. The data processing apparatus according to claim 1, wherein said display unit includes an LCD.

8. The data processing apparatus according to claim 1, wherein said data processing apparatus is a facsimile apparatus.

9. A data processing method that is executed in a data processing apparatus, comprising:
    a receiving step of receiving data from an external apparatus;
    a display data generating step of analyzing the data received in said receiving step and generating display data indicating a screen to be displayed on a display unit of the data processing apparatus;
    a displaying step of displaying the screen on the display unit based on the display data generated in said display data generating step;
    a display data storing step of storing the display data generated in said display data generating step in a display data storage unit;
    a print data generating step of generating print data indicating an image to be printed corresponding to a plurality of screens from the display data generated in said display data generating step corresponding to a plurality of screens; and
    a printing step of printing the image corresponding to the plurality of screens based on the print data generated in said print data generating step,
    wherein, if it is determined that the display data indicating one of the plurality of screens is stored in the display data storage unit, said print data generating step generates the print data corresponding to the one of the plurality of screens from the display data which is stored in the display data storage unit, and
    if it is determined that the display data indicating another of the plurality of screens is not stored in the display data storage unit, said display data generating step generates the display data indicating the another of the plurality of screens and said print data generating step generates the print data corresponding to the another of the plurality of screens from the display data which is generated in said display data generating step after it is determined that the display data indicating the another of the plurality of screens is not stored in the display data storage unit.

10. The data processing method according to claim 9, wherein said print data generating step combines display data corresponding to a set number of screens into the print data.

11. The data processing method according to claim 9, wherein said receiving step is capable of receiving web data via a telephone line.

12. The data processing method according to claim 9, wherein the data processing apparatus is a facsimile apparatus.

13. A computer-readable memory medium which stores a data processing program for a data processing method, said data processing program causing a computer to execute:

a receiving step of receiving data from an external apparatus;

a display data generating step of analyzing the data received in said receiving step and generating display data indicating a screen to be displayed on the display unit;

a displaying step of displaying the screen on the display unit based on the display data generated in said display data generating step;

a display data storing step of storing the display data generated in said display data generating step in a display data storage unit;

a print data generating step of generating print data indicating an image to be printed corresponding to a plurality of screens from the display data generated in said display data generating step; and a printing step of printing the image corresponding to the plurality of screens based on the print data generated in said print data generating step, wherein, if it is determined that the display data indicating one of the plurality of screens is stored in the display data storage unit, said print data generating step generates the print data corresponding to the one of the plurality of screens from the display data which is stored in the display data storage unit, and if it is determined that the display data indicating another of the plurality of screens is not stored in the display data storage unit, said display data generating step generates the display data indicating the another of the plurality of screens and said print data generating step generates the print data corresponding to the another of the plurality of screens from the display data which is generated in said display data generating step after it is determined that the display data indicating the another of the plurality of screens is not stored in said display data storage unit.

* * * * *